US008274706B2

(12) United States Patent
Monga et al.

(10) Patent No.: US 8,274,706 B2
(45) Date of Patent: Sep. 25, 2012

(54) SYSTEM AND METHOD FOR HALFTONE INDEPENDENT TEMPORAL COLOR DRIFT CORRECTION IN HI-ADDRESSABILITY XEROGRAPHIC PRINTERS

(75) Inventors: Vishal Monga, Webster, NY (US); Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 893 days.

(21) Appl. No.: 12/355,450

(22) Filed: Jan. 16, 2009

(65) Prior Publication Data

US 2010/0182616 A1    Jul. 22, 2010

(51) Int. Cl.
*G06K 15/00* (2006.01)
(52) U.S. Cl. ......... 358/3.06; 358/504; 358/518; 358/1.9
(58) Field of Classification Search .................. None
See application file for complete search history.

(56) References Cited

U.S. PATENT DOCUMENTS

| | | | |
|---|---|---|---|
| 5,469,267 A | 11/1995 | Wang | |
| 5,734,801 A * | 3/1998 | Noguchi et al. | 358/1.9 |
| 5,748,330 A | 5/1998 | Wang et al. | |
| 5,749,020 A | 5/1998 | Mestha et al. | |
| 5,854,882 A | 12/1998 | Wang et al. | |
| 5,943,477 A | 8/1999 | Rao et al. | |
| 6,266,157 B1 | 7/2001 | Fan et al. | |
| 6,435,654 B1 * | 8/2002 | Wang et al. | 347/43 |
| 6,606,167 B1 | 8/2003 | Rees et al. | |
| 6,694,109 B1 | 2/2004 | Donaldson et al. | |
| 6,744,531 B1 | 6/2004 | Mestha et al. | |
| 6,775,029 B1 | 8/2004 | Wen et al. | |
| 6,804,025 B1 * | 10/2004 | Ueda et al. | 358/1.9 |
| 6,851,785 B2 * | 2/2005 | Wu et al. | 347/19 |
| 7,307,752 B1 | 12/2007 | Mestha et al. | |
| 7,419,238 B2 * | 9/2008 | Yoshida | 347/19 |
| 7,570,402 B2 * | 8/2009 | Yoshida | 358/521 |
| 7,710,609 B2 * | 5/2010 | McElvain | 358/3.27 |
| 7,724,406 B2 * | 5/2010 | Wang et al. | 358/504 |
| 7,787,147 B2 * | 8/2010 | Yoshida et al. | 358/1.8 |
| 7,948,666 B2 * | 5/2011 | Yoshida et al. | 358/518 |
| 2002/0085235 A1 | 7/2002 | Degani et al. | |
| 2004/0012817 A1 | 1/2004 | Brewington et al. | |
| 2004/0046820 A1 * | 3/2004 | Wu et al. | 347/19 |
| 2004/0150858 A1 | 8/2004 | Cholewo et al. | |
| 2006/0066879 A1 * | 3/2006 | Bast et al. | 358/1.1 |
| 2006/0119907 A1 * | 6/2006 | Takahashi | 358/504 |

(Continued)

FOREIGN PATENT DOCUMENTS

EP    0398502    11/1990

(Continued)

OTHER PUBLICATIONS

Allebach J P et al: "Model-based digital halftoning" IEEE Signal Processing Magazine, Ieee Service Center, Piscataway, NJ, US LNKD-D01:10.1109/MSP.2003.1215227, vol. 20, No. 4, Jul. 1, 2003, pp. 14-27, XP011098942 ISSN: 1053-5888.
Hersch R.D.: "Improving the Yule-Nielsen modified spectral Neugebauer model by dot surface coverages depending on the ink superposition conditions" Proceedings of the Spie, vol. 5667, No. 1, Jan. 17, 2005, pp. 434-447, P002578207 San Jose.

(Continued)

*Primary Examiner* — Dung Tran
(74) *Attorney, Agent, or Firm* — Duane C. Basch; Basch & Nickerson LLP

(57) ABSTRACT

Systems and methods are described for halftone independent temporal color drift correction, particularly for correction in hi-addressability xerographic printers. For example, a method includes printing target patches, including two resolutions, measuring printer response from the target patches, and modeling the printer using a transformation to define a correction factor, and a predicted response.

14 Claims, 15 Drawing Sheets

U.S. PATENT DOCUMENTS

| | | | |
|---|---|---|---|
| 2006/0152764 A1* | 7/2006 | Loce et al. | 358/3.06 |
| 2006/0256408 A1* | 11/2006 | Yoshida et al. | 358/518 |
| 2006/0262361 A1* | 11/2006 | Nakano et al. | 358/504 |
| 2007/0177231 A1* | 8/2007 | Wang et al. | 358/504 |
| 2008/0055355 A1* | 3/2008 | Hersch et al. | 347/19 |
| 2008/0226316 A1* | 9/2008 | Koshimura et al. | 399/49 |

FOREIGN PATENT DOCUMENTS

| | | |
|---|---|---|
| EP | 1152598 | 11/2001 |
| EP | 1365576 | 11/2003 |
| WO | WO0191453 | 11/2001 |
| WO | WO2008133629 | 11/2008 |

OTHER PUBLICATIONS

A European Search Report for European Patent Application EP10150479.3 that corresponds to U.S. Appl. No. 12/355,450.

File history of US Patent 7,724,406.

Mallat, Stephane; A Wavelet Tour of Signal Processing; Academic Press 1998; pp. 1-19; 56-61; 74-76.

Wang, S.; Two-by-two centering printer model with Yule-Nielsen Equation; Proc. IS&T NIP14, 1998.

Bala, R.; Device Characterization; Digital Color Imaging Handbook, Chapter 5 (CRC Press, ©2003).

* cited by examiner

G4

G5

G6

SYSTEM AND METHOD FOR HALFTONE INDEPENDENT TEMPORAL COLOR DRIFT CORRECTION IN HI-ADDRESSABILITY XEROGRAPHIC PRINTERS

The present disclosure is directed to halftone independent temporal color drift correction, and more particularly to a system and method for such correction in hi-addressability xerographic printers.

BACKGROUND AND SUMMARY

In today's business and scientific world, color is essential as a component of communication. Color facilitates the sharing of knowledge, and as a result companies involved in the development of digital color print engines are continuously seeking to improve the image quality of such products. One of the elements that affect image quality is the ability to consistently produce the same image quality on a printer over time. Colors on a printer tend to drift due to ink/toner variations, temperature fluctuations, type of media used, environment, etc. There has been a long felt commercial need for efficiently maintaining print color predictability, particularly as print media places greater importance on the accurate representation of merchandise in print and display media.

Almost all color printers present some amount of temporal color drift, regardless of the nature of the print engine, etc. To maintain consistent color reproduction, it is generally necessary to monitor the printer performance and from time to time apply corresponding color adjustment to the printer. Although a full color characterization, for example as described by R. Bala, in "Device Characterization", Digital Color Imaging Handbook, Chapter 5 (CRC Press, ©2003), certainly can correct temporal color drift, some simpler color correction methods based on the 1-D tonal response curve (TRC) calibration for each individual channel usually are sufficient and are much easier to implement. The 1-D approach also readily lends itself to the use of in-line sensors for color measurement as described, for example in U.S. Pat. No. 6,744,531 to L. Mestha et al. Many different apparatus and methods have been proposed on this subject and most of them, like most color calibration and color characterization methods (see e.g., "Device Characterization" by R. Bala, supra), are halftone dependent.

The most popular technique to build a printer characterization transform involves printing and measuring a large set of color samples, i.e. CMY(K) patches, in conjunction with mathematical fitting and interpolation to derive CMY(K)->Lab mappings. The accuracy of the characterization transform clearly depends on the number (N) of patches printed and measured. Crucially, note that these patches correspond to continuous tone CMY digital values, i.e. their binary representation is halftone dependent. Therefore, for color printers equipped with multiple halftone screens or halftone methods, the measurement and the correction has to be repeated as many times as the number of the halftones. For example, for a CMYK color printer equipped with five different halftone screens, monitoring the four channel TRCs needs a total of 4×5×N patches, where N is the number of chosen digital levels to print and to measure for each channel and each halftone screen. From practice it has been shown that the number of patches N for each halftone cannot be too small because the halftone TRC is usually not a smooth curve. The shape of a TRC depends not only on the design of the digital halftone screen, but also on the dot overlapping and other microscopic geometries of the physical output from the printer.

For example, FIG. 1 illustrates the measured TRCs for a 200 line per inch (lpi) halftone screen. The solid and the dashed lines represent the results from printouts on two different paper substrates, respectively. It should be noted that neither TRC is very smooth; instead, they have a piecewise nature. If there are not enough levels printed and measured, an accurate estimate of the true TRC for the full range (i.e. digital level 0-255) cannot be derived even using sophisticated sampling and interpolation methods. It is not unusual, therefore, to find that even N=16 patches (for each colorant channel) are not enough for a good TRC estimation. Thus, existing color correction methods when applied across multiple halftone screens likely prove to be time and measurement intensive and may not be desirable especially for an in-line correction.

In accordance with aspects of the disclosure temporal color drift of a printer can be corrected by a re-calibration of the color printer, quite often, by re-measuring and obtaining the tone response curves (TRCs) of the individual channels. For a printer equipped with multiple halftone screens or halftone methods, the color calibration process has to be repeated for each halftone selection. Furthermore, due to dot overlapping and other intrinsic microscopic structure, the native tone response of a halftone screen is seldom a smooth function. To get an accurate calibration of a halftone screen, the required number of patches to print, or the number of digital levels, cannot be too small. Therefore, it is believed beneficial to develop a halftone independent color drift correction method.

A halftone independent color correction method was proposed by Shen-ge Wang, in co-pending U.S. Application 11/343,656 for "Halftone Independent Color Drift Correction" filed Jan. 31, 2006 (US2007/0177231-A1), hereby incorporated by reference in its entirety, based on a 2×2 binary printer model for printers with isomorphic resolution up to 600 dpi.

Halftone independent color correction methods disclosed in above references are based on a 2×2 binary printer model for printers with isomorphic resolution up to 600 dpi. A fundamental assumption of the 2×2 printer model is that the rendered physical spot is no more than two logical image pixels wide. However, hi-addressability xerographic printers with printing resolutions much higher than 600 dpi violate this assumption. A halftone-independent color correction scheme was developed based on combining color predictions made using the 2×2 printer model for targets of varying resolution. Experiments conducted using two different 4800×600 hi-addressability printers confirm that the proposed color correction is very good and comparable to measurement and computation intensive halftone-dependent methods. Further benefits lie in the computational simplicity of the proposed scheme, and patch measurements that may be acquired by either a colorimetric device or a common desktop scanner.

Disclosed in embodiments herein is a model-based, halftone independent method for characterizing a high-addressability printer equipped with a plurality of halftone screens, comprising: printing a target set of basic patches, said target set including patches having at least two resolutions and comprised of a fundamental binary pattern independent of a halftone screen; measuring printer response from the target set; modeling a halftone independent characterization of the printer with a mathematical transformation using the measured response; modeling a first halftone dependent characterization of the printer with the mathematical transformation to generate a first predicted result using a halftone screen; comparing a measured response of the printer using this halftone screen with the predicted result to define a correction factor corresponding to the halftone screen; and modeling a second halftone dependent characterization of the printer using a predicted response of the fundamental binary pattern and the correction factor.

Further disclosed in embodiments herein is a halftone independent method for high-addressability device characterization comprising: calculating a binary printer model which is halftone independent; retrieving one of a set of user-selected halftones and a corresponding halftone correction factor; deriving a halftone correction factor as a mathematical transformation between a true color value as measured from the device, for at least two resolutions, and the predicted color value; processing a device color value using the selected halftone, the online binary printer model and a halftone correction factor to predict colorimetric values; and using the device color value and the predicted colorimetric values to produce an improved printer characterization for the user selected halftone.

Also disclosed herein is a high-addressability printing system equipped with a plurality of halftone screens, comprising: memory storing at least one set of basic patches, said set including patches having at least two resolutions; a marking system for printing a target set of basic patches, said target set including patches having at least two resolutions and comprised of a fundamental binary pattern independent of a halftone screen; a colorimetric device, said device measuring printer response from the target set; and a color balance controller, said controller using the measured response and modeling a halftone independent characterization of the printer with a mathematical transformation to generate a first predicted result using a halftone screen, said color balance controller, further comparing a measured response of the printer using this halftone screen with the predicted result to define a correction factor corresponding to the halftone screen, and modeling a second halftone dependent characterization of the printer using a predicted response of the fundamental binary pattern and the correction factor.

The various embodiments described herein are not intended to limit the invention to those embodiments described. On the contrary, the intent is to cover all alternatives, modifications, and equivalents as may be included within the spirit and scope of the appended claims.

DETAILED DESCRIPTION

As more particularly set forth below, the disclosed system and methods are directed to the calibration of high-addressability printing systems.

In order to properly characterize the improved color correction, a 2×2 Printer Model is briefly reviewed. Previously, S. Wang and others, as noted above, proposed the halftone independent printer model, the 2×2 model, for calibrating black/white and color printers (see e.g., U.S. Pat. Nos. 5,469,267, 5,748,330, 5,854,882, 6,266,157, 6,435,654, and S. Wang, "Two-by-two centering printer model with Yule-Nielsen Equation", Proc. IS&T NIP14, 1998, all of which are hereby incorporated by reference in their entirety). For the current disclosure, the 2×2 concept for the black/white, or monochromatic, applications is briefly characterized.

Figure 3:
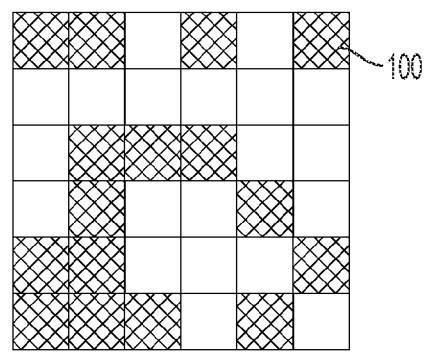
FIG. 3 is a representation of an idealized non-overlapping printer model.

Few hard-copy devices generate square-shape non-overlapping output pixels 100 as shown in FIG. 3; representing an idealized non-overlapping printer model. Instead, overlapping between adjacent spots is not only common but quite significant from most printers. The combination of geometric overlapping and optical scattering in the paper or substrate creates many difficulties even in modeling a simple black/white printer. The most common printer model considering dot overlapping (e.g., 110) is the circular-dot printer model, illustrated for example in FIG. 4.

Figure 4:
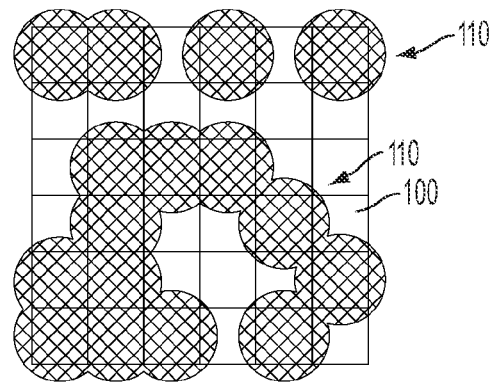
FIG. 4 is a representation of an exemplary circular-dot printer model.
Figure 5:
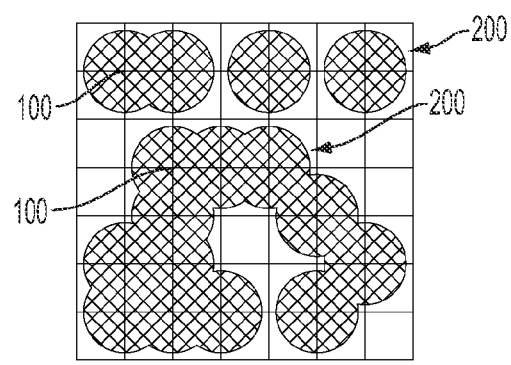
FIG. 5 is an exemplary representation of a Two-by-two printer model in accordance with an aspect of the disclosed method.
Figure 6A:
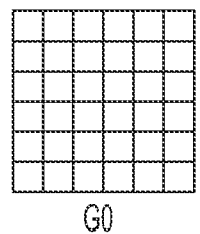
FIGS. 6A-6G illustrate seven 2×2 calibration patches representing seven "solid" gray levels.
Figure 6B:
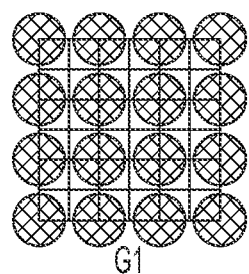
Figure 6C:
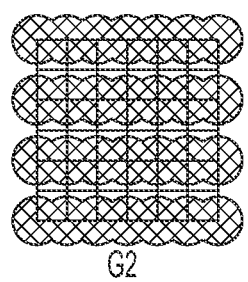
Figure 6D:
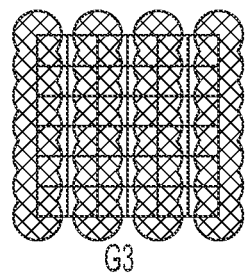
Figure 6E:
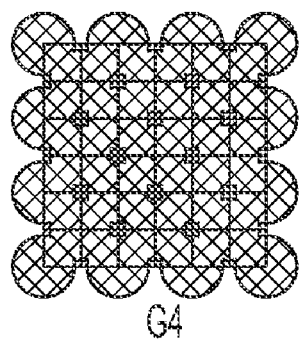
Figure 6F:
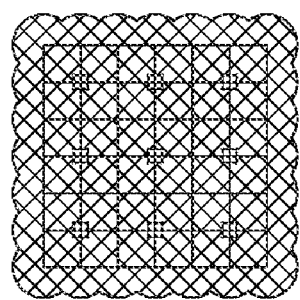
Figure 6G:
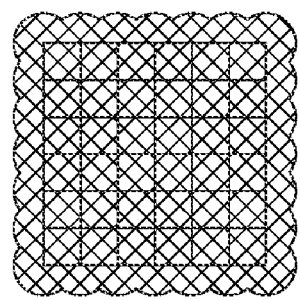

The difference between the 2×2 printer model, shown by FIG. 5, and the conventional approach, shown by FIG. 4, is the definition of the output pixels. In FIG. 5, each output pixel, represented by a rectangle 100, is centered coincident with the circular spot, representing the physical output by the printer. Obviously, the grid defining the output pixels is a conceptual coordinate for modeling purpose only. Any change on the grid, or the coordinate, will not affect the actual physical output of the printer at all. Therefore, it is possible to shift the grid to the position shown in FIG. 5, so that each spot 200, representing the physical output, is centered at one cross point of the grid 210.

Although the dot pattern in FIG. 5 is exactly the same one in FIG. 4, overlapping details within output pixels defined by the new grid in FIG. 5 are completely different from output pixels defined by a conventional coordinate, shown in FIG. 4. It is not difficult to prove that there are only $2^4=16$ different overlapping patterns in the 2×2 printer model, instead of $2^9=512$ different overlapping patterns in the conventional circular-dot model. The 16 different overlapping patterns can be further grouped into seven categories, G0 to G6, as represented by the seven patches shown in FIGS. 6A-6G. The patches G0 and G6 are solid white and solid black, respectively. The patch G1 is one of four different overlapping patterns, which are mirror images to each other. Similarly, patch G5 is also formed of four overlapping patterns. Each of the patches G2, G3 and G4 are one of two different overlapping patterns, which are also mirror images to each other. Therefore, in terms of the "ink" coverage, or the gray level, all pixels of each of the seven patches are identical. In other words, each patch only consists of one gray level at the pixel level, just like the solid white or black, and this gray level can be measured as exactly as any solid color.

Figure 7:
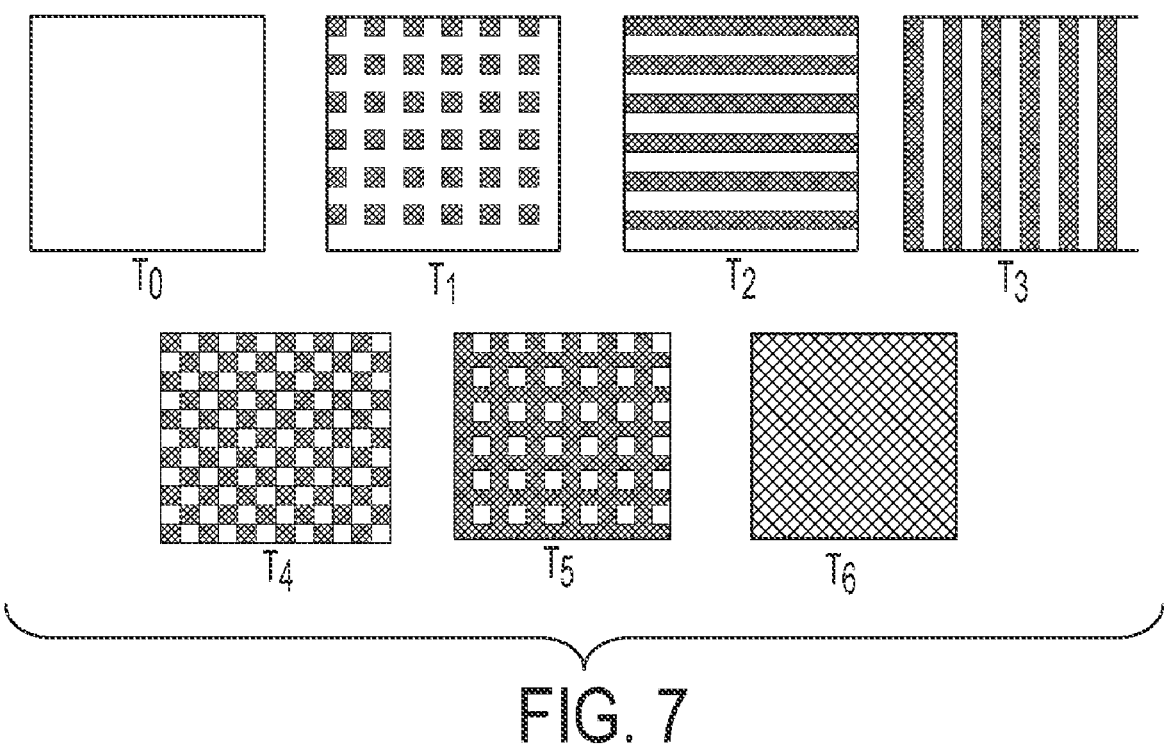
FIG. 7 illustrates seven 2×2 binary patterns defining seven "solid" levels for a single colorant printer (e.g., cyan) in accordance with the disclosed methods.

The ideal binary representations of the seven 2×2 patches (T0-T6) are shown in FIG. 7. Once the seven 2×2 patches are printed and the corresponding seven "solid" gray levels are measured, the 2×2 printer model can be used to predict the gray output of any binary pattern. For example, the output of the binary pattern in FIG. 3 can be illustrated by FIG. 5 using the 2×2 printer model and described by Table 1, where G0-G6 are the measured gray levels from one of the corresponding seven 2×2 patches T0-T6, respectively (i.e., binary output illustrated in FIG. 3 represented as one of seven 2×2 patterns for each cell in the table).

TABLE 1

| G1 | G2 | G1 | G1 | G1 | G1 | G1 |
|----|----|----|----|----|----|----|
| G1 | G2 | G1 | G1 | G1 | G1 | G1 |
| G0 | G1 | G2 | G2 | G1 | G0 | G0 |
| G0 | G3 | G5 | G2 | G4 | G1 | G0 |
| G1 | G5 | G3 | G0 | G1 | G4 | G1 |
| G2 | G6 | G5 | G1 | G1 | G4 | G1 |
| G1 | G2 | G2 | G1 | G1 | G1 | G0 |

To estimate the average gray output of any binary pattern, the 2×2 printer model uses the Neugebauer equation with the Yule-Nielson modification as follows:

$$G_{AVG}^{\frac{1}{\gamma}} = \sum_{i=0}^{6} n_i G_i^{\frac{1}{\gamma}} \qquad \text{Eq. 1}$$

where $G_i$, i=0 to 6, is the measured gray level of each of the seven 2×2 patches, n1 is the number of pixels of the corresponding 2×2 patch in the given binary pattern, and $\gamma$ is the Yule-Nielsen factor, which is often chosen as a fitting parameter. As a further example, the average gray level of the binary pattern shown in FIG. 2 can be estimated as $$G_{AVG} = (7G_0^{1/\gamma} + 25G_1^{1/\gamma} + 8G_2^{1/\gamma} + 2G_3^{1/\gamma} + 3G_4^{1/\gamma} + 3G_5^{1/\gamma} + G_6^{1/\gamma})^{\gamma} \qquad \text{Eq. 2}$$

The color 2×2 printer model can be described in a similar manner and can be found in the references noted previously. The 2×2 printer model can predict the color appearance of any binary patterns for a given color printer and the color accuracy of the prediction by the 2×2 model is very high for printers with relatively uniform spot shapes, for example inkjet printers.

Color correction or calibration algorithms typically use the response of a printer along each (e.g. C, M, Y, K) of its colorant channels. In such cases, the monochrome 2×2 model can successfully be employed for predicting color response of the printer along the individual colorant channels. Xerographic printers however, usually do not generate uniform round-shape spots for isolated single pixels and the dot overlapping is more complicated than inkjet outputs. The 2×2 printer model applied to a xerographic printer may yield larger prediction errors. However, modeling of these systematic errors leads to aspects of the disclosed color correction scheme. For example, in previous work on temporal drift correction (e.g., co-pending Ser. No. 11/343,656 by S. Wang et al., for "Halftone Independent Color Drift Correction") for printers with isomorphic resolution up to 600 dpi, a core underlying principle was identified. The basic premise was that, over time, for each colorant and halftoning algorithm, the 2×2 predicted response deviates from the true printer response in an invariant manner.

Mathematically, this may be described as:

$$R_{true}(t,i,H) = f(R_{2\times2}(t,i,H)) \qquad \text{Eq. 3}$$

where $R_{true}(t,i,H)$=true/measured response of $i^{th}$ colorant at time t, $R_{2\times2}(t,i,H)$=2×2 predicted response of $i^{th}$ colorant at time t and H represents the halftoning method used, i=C, M, Y, K In particular, this invariant relationship may be given as $$\frac{R_{true}(t_1, i, H)}{R_{2\times2}(t_1, i, H)} = \frac{R_{true}(t_2, i, H)}{R_{2\times2}(t_2, i, H)} \qquad \text{Eq. 4}$$

where $R_{true}(t,i,H)$=true/measured response of $i^{th}$ colorant at time t in deltaE from paper;
$R_{2\times2}(t,i,H)$=2×2 predicted response of $i^{th}$ colorant at time t in deltaE from paper; and
H represents the halftoning method used, i=C, M, Y, K.

The illustrated relationship states that, given the knowledge of the 2×2 and true/measured printer response at a default or reference printer state t1, it is possible to estimate the true response at a drifted state t2 as:

$$\hat{R}_{true}(t_2, i, H) = \frac{R_{true}(t_1, i, H)}{R_{2\times2}(t_1, i, H)} R_{2\times2}(t_2, i, H) \qquad \text{Eq. 5}$$

Alternatively, the above may be rewritten as:

$$\hat{R}_{true}(t_2, i, H) = \frac{R_{2\times2}(t_2, i, H)}{R_{2\times2}(t_1, i, H)} R_{true}(t_1, i, H) \qquad \text{Eq. 6}$$

Figure 1:
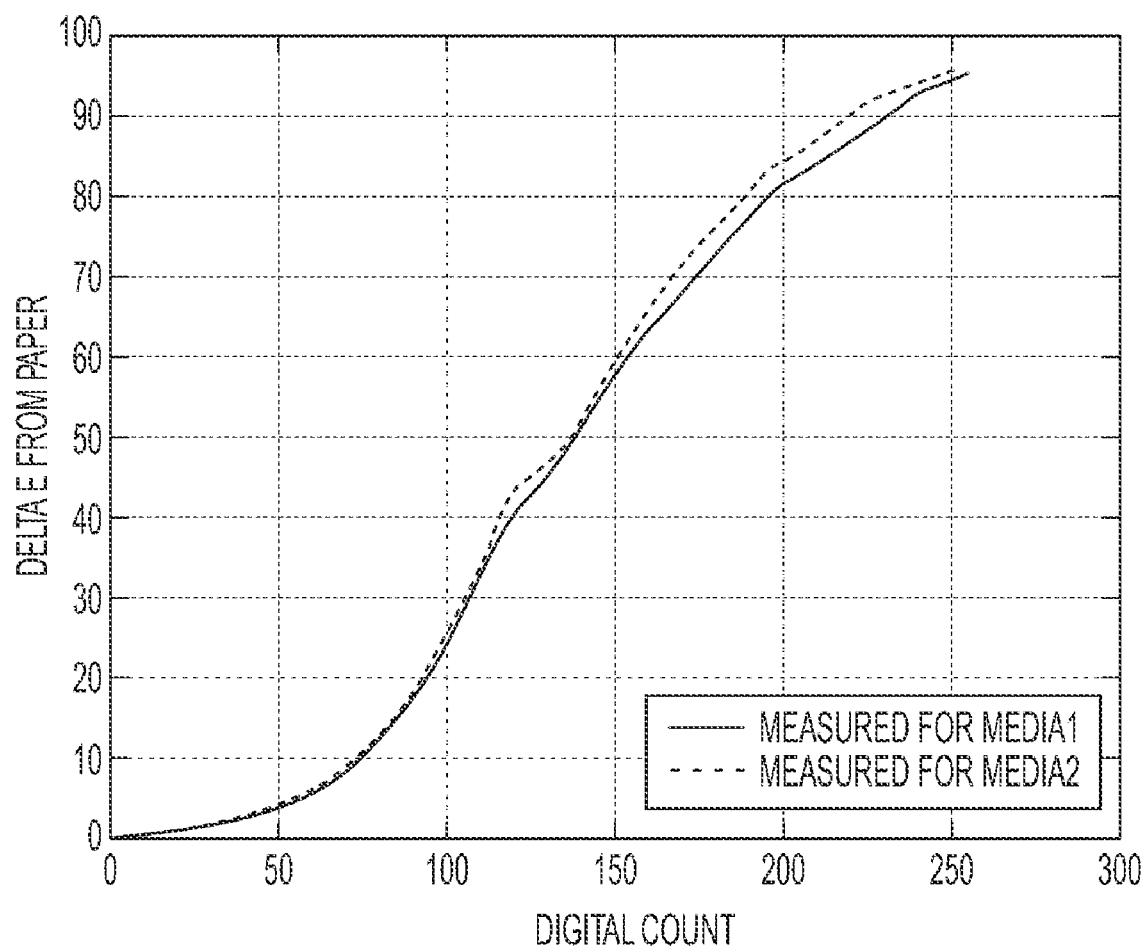
FIG. 1 is a graphical illustration of exemplary measured TRCs for a halftone screen.
Figure 2:
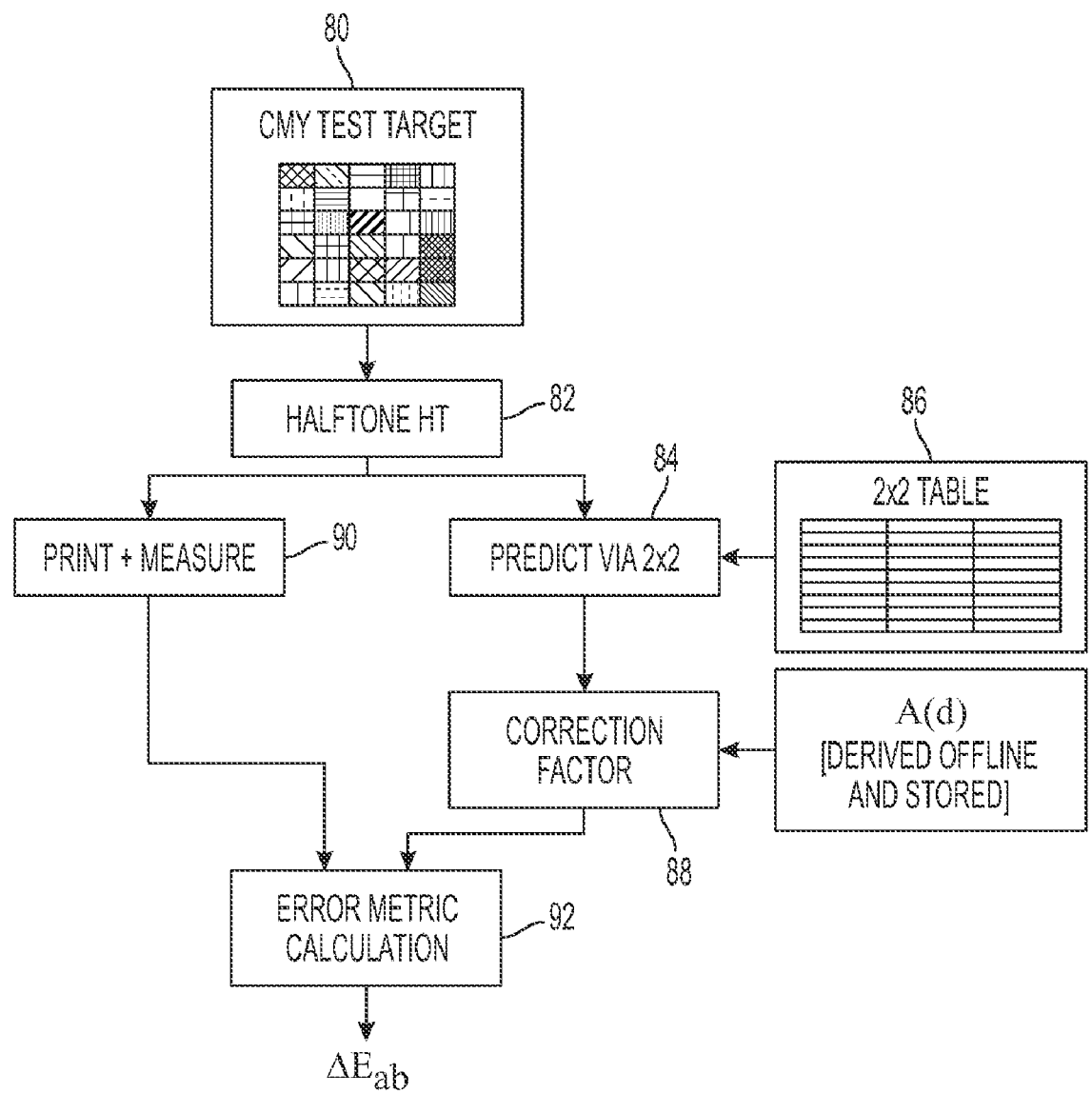
FIG. 2 is an illustrative example of possible embodiment for the disclosed system for carrying out the methods disclosed herein.

Referring to FIG. 2, it can be seen that a particular printer device can be characterized with a reduced number of CMY test target color values 80 for a particular halftone screen pattern 82 by using the disclosed model determined offline with the fundamental binary pattern that is halftone independent 84, 86 and a correction factor (e.g., sum of weighting factors of at least two resolutions) that has been previously derived offline and then stored for correspondence to the selected halftone screen 82. The true color values of the printing device are measured 90 and in error metric calculation, $\Delta E_{ab}$ 92 is calculated for use in the transform for characterizing printing system operation. Printing, as represented in 90, may be carried out by a marking system for printing a target set of patches, including patches having at least two resolutions and comprised of a fundamental binary pattern independent of a halftone screen. Measurement as referenced in 90 may be completed by a colorimetric device, the device measuring printer response from the target set, wherein a color balance controller uses the measured response and modeling a halftone independent characterization of the printer with a mathematical transformation.

Based upon pre-computed and stored knowledge of the true printer response and the 2×2 printer response at a reference printer state t1, an estimate of the true printer response at a drifted printer state t2 could be accurately determined by printing and measuring only the halftone independent 2×2 patches (7 for each colorant and 25 for a 4 color printer; discounting the repeated measurements of the white patch). The crucial assumption in the equation above is that the functional mapping from the 2×2 predicted response does not depend on time. Physically, such a modeling is motivated by the fact that the difference between the 2×2 printer model and the true measured response is attributed to the geometric assumptions made by the model. It is reasonable then to assume that the differences in the dot overlap geometry assumed by 2×2 versus the true dot overlap geometry should, on average, be the same irrespective of time, i.e. in particular the relationship between the 2×2 and true response should be mathematically invariant across time. This assumption was experimentally verified in previous work S. Wang, et al. as noted previously.

However, a meaningful color response prediction is difficult to obtain via the 2×2 printer model for hi-addressability xerographic printers, particularly with resolutions much greater than 600 dpi, because a premise fundamental to the 2×2 printer model is that the rendered physical spot should not be more than two digital pixels wide. This premise is violated for hi-addressability printers. In view of this difficulty, the relationship between a "low-resolution" 2×2 prediction and the true hi-res response of the printer along each of the colorant channels cyan, magenta, yellow and black (C, M, Y, K, respectively) was investigated. As a result, it was determined that a similar invariance could hold, but that 2×2 predictions from several different, lower resolutions needed to be combined. The current disclosure is, therefore, directed to a new halftone-independent color correction for hi-addressability xerographic printers.

Figure 8A:
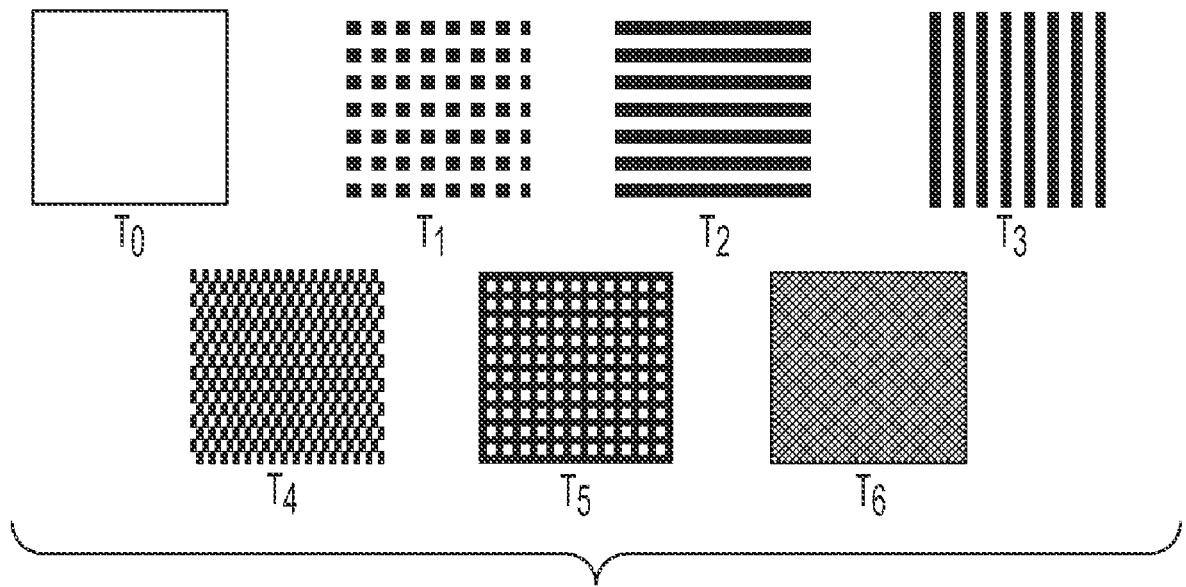
FIGS. 8A-8C are representative illustrations of "low-resolution" 2×2 patches for a typical 8× high addressability printer as described herein.
Figure 8B:
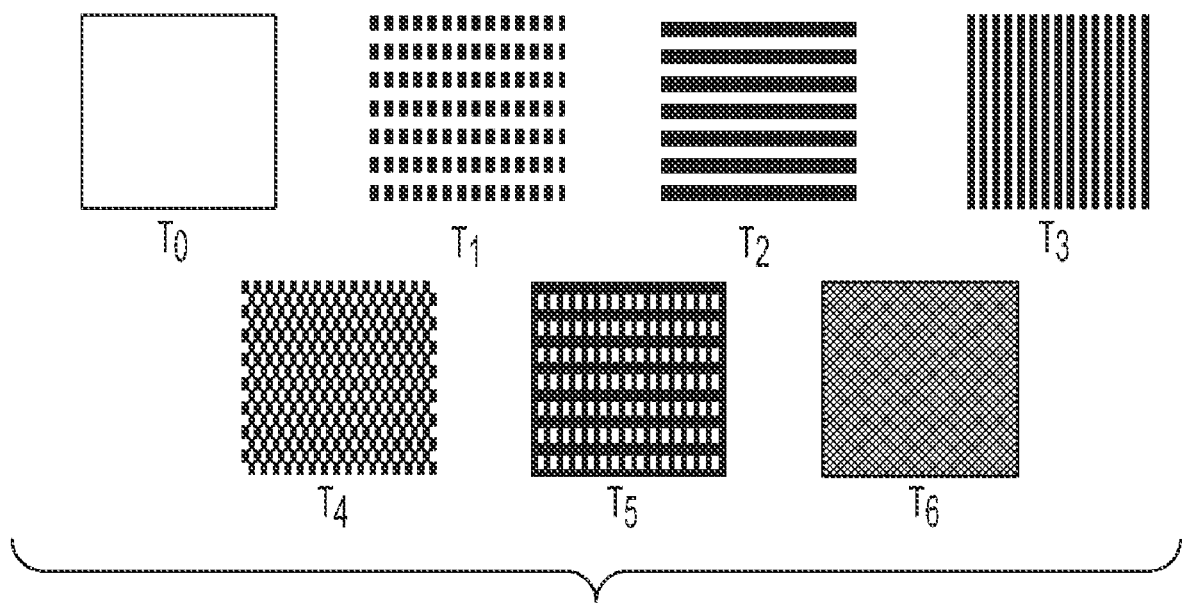
Figure 8C:
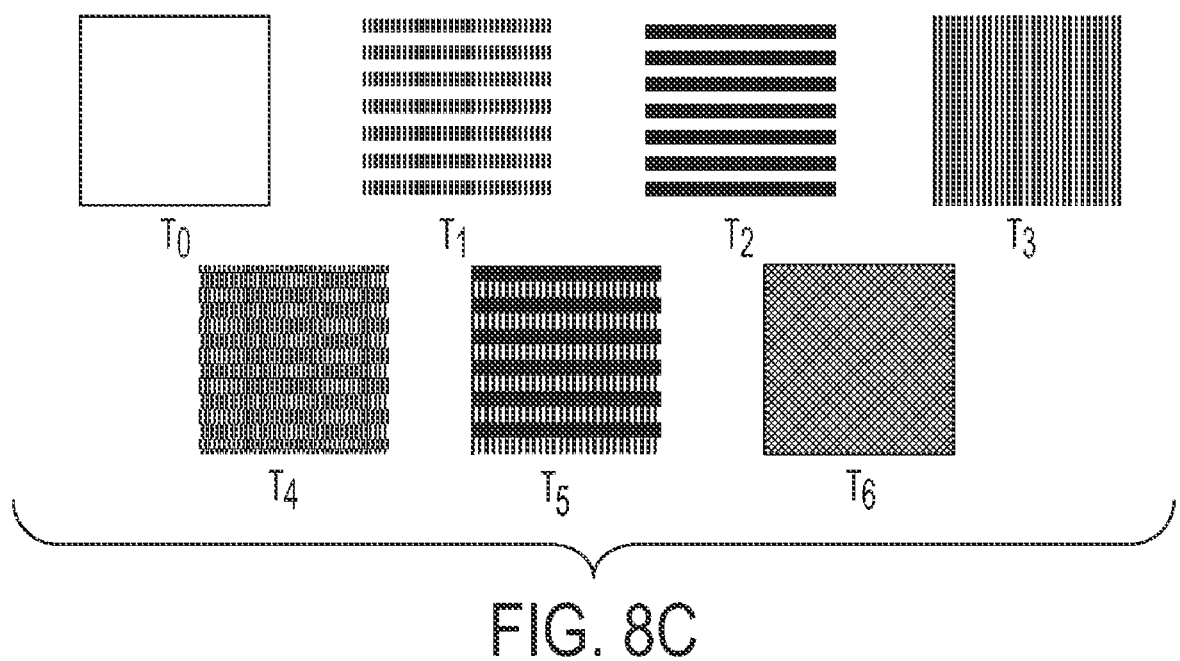

FIGS. 8A-8C show, respectively, "low-resolution" 2×2 patches for a typical 8× high addressability printer used in experiments (e.g., where resolution in one direction is eight times the resolution in the perpendicular direction)-respectively illustrating a cyan channel at resolutions of 600, 1200 and 2400×600. As is apparent from FIGS. 8A-C, it is possible to obtain low-resolution 2×2 predictions by pixel replication of the 2×2 binary patterns in the digital file, and subsequently obtain macroscopic measurements of the printed patch. As an example, for an 8× hi-addressability printer of resolution 4800×600 a "low-resolution 1×" 2×2 prediction is obtained by printing and measuring 2×2 patches at 600×600 with pixel replication by a factor of eight in the appropriate direction. Because assumptions of the 2×2 printer model hold approximately true at these lower-resolutions, a goal was to explore if there is a stable pattern to the way the low-resolution 2×2 predictions deviate from the true hi-addressability response. It was observed that an invariance similar to the one developed before holds, but that 2×2 predictions from several different lower resolutions need to be combined.

In particular, it was determined that an estimate of the true hi-resolution printer response at time t2 is given by:

$$\hat{R}_{true}(t_2, i, H) = \left[\sum_j w_j \frac{R^j_{2\times 2}(t_2, i, H)}{R^j_{2\times 2}(t_1, i, H)}\right] R_{true}(t_1, i, H) \quad \text{Eq. 7}$$

$$\text{such that } \sum_j w_j = 1$$

where i, H are as before and j denotes the resolution of the 2×2 prediction; as an example for an 8× hi-addressability printer j=1×, 2×, 4× etc.

Figure 9:
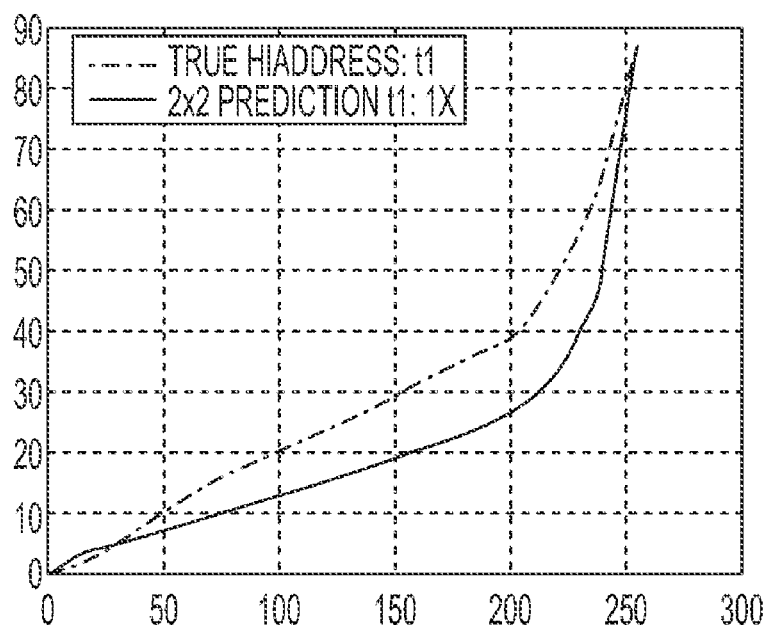
FIGS. 9-22 are graphical illustrations of various TRC curves for aspects of the disclosed embodiments.
Figure 10:
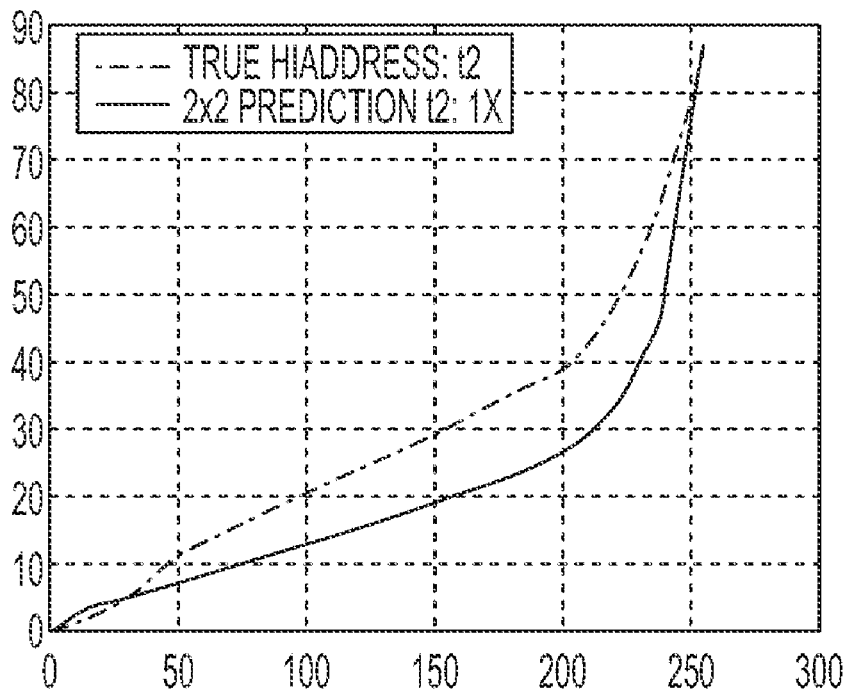
Figure 11:
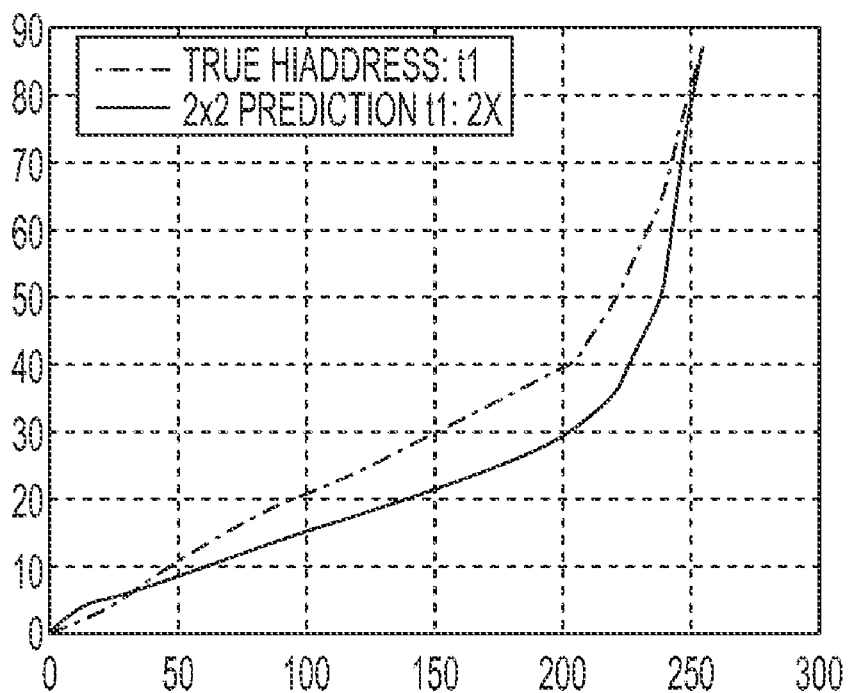
Figure 12:
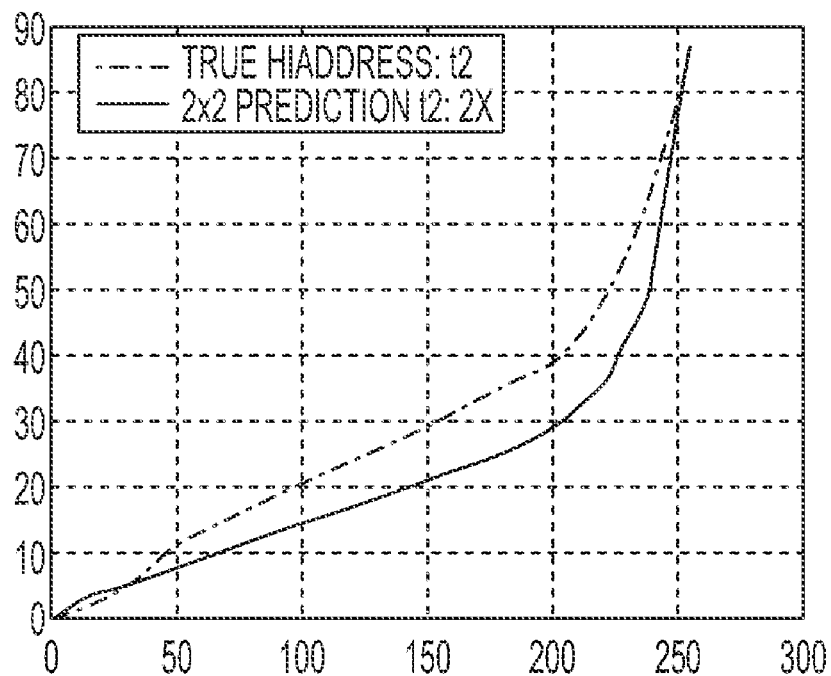
Figure 13:
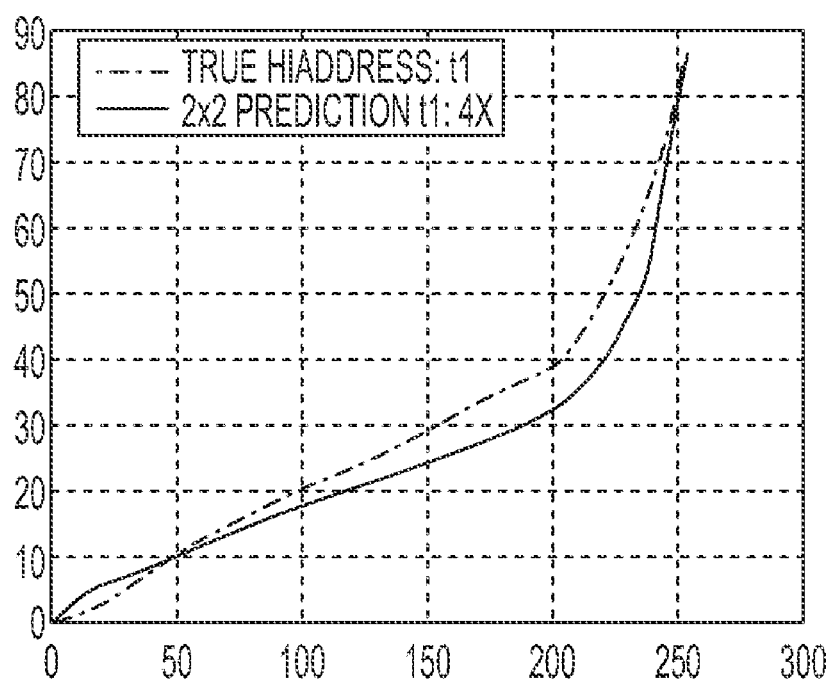
Figure 14:
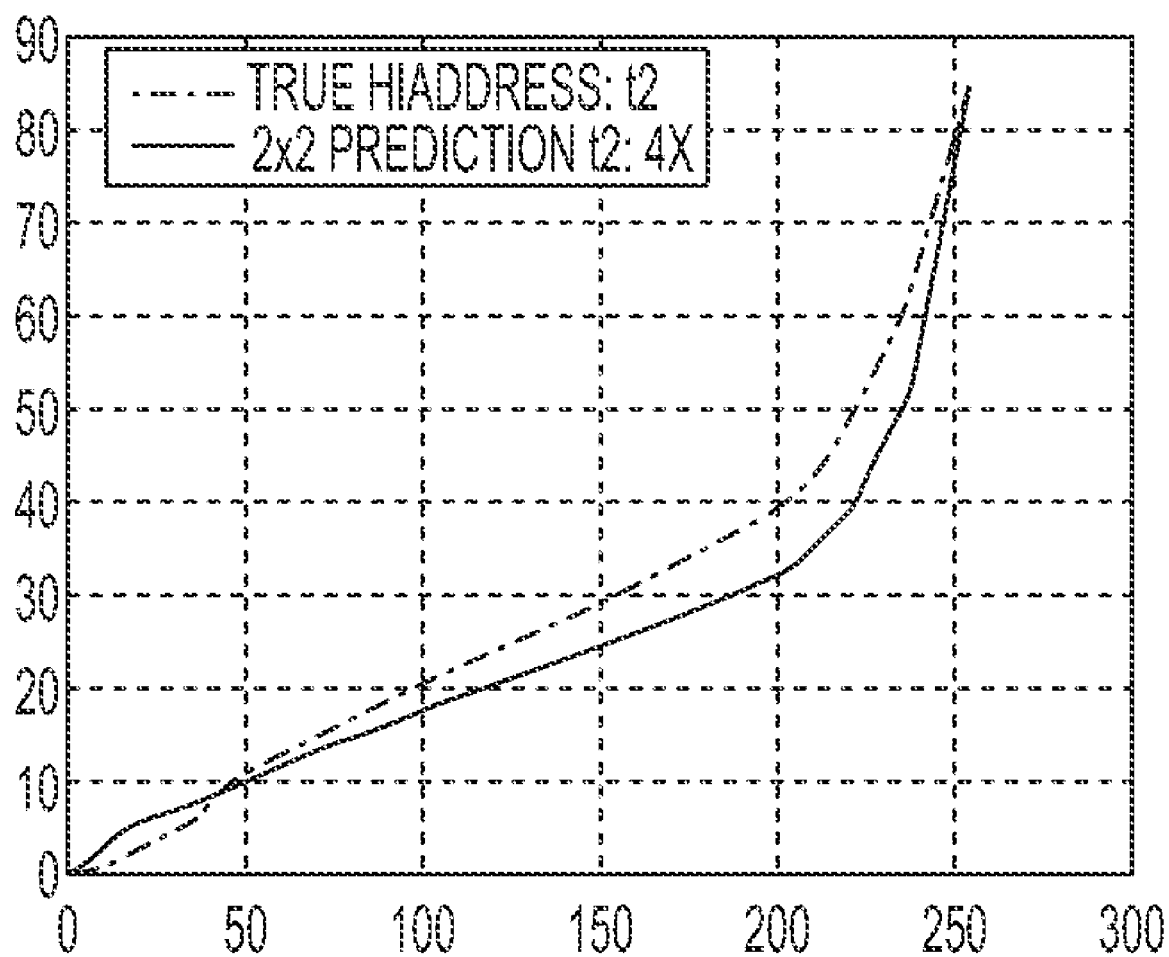

FIGS. 9 and 10, respectively, plot the 2×2 predicted response (solid) and the true printer response (dashed) for the Magenta channel at default (t1) and drifted (t2) printer states. A 175 lpi clustered dot halftone screen was employed. Both responses are in deltaE (ΔE) from paper and for a 4800×600 (i.e. 8× hi-addressability), for example a xerographic printer. The 2×2 prediction in FIGS. 9 and 10 is obtained by printing and measuring the 2×2 patches at 1× resolution (i.e. 600×600 binary and scaled by a factor of 8). Similar plots for resolutions 2× and 4× are shown in FIGS. 11-12 and FIGS. 13-14, respectively.

Figure 15:
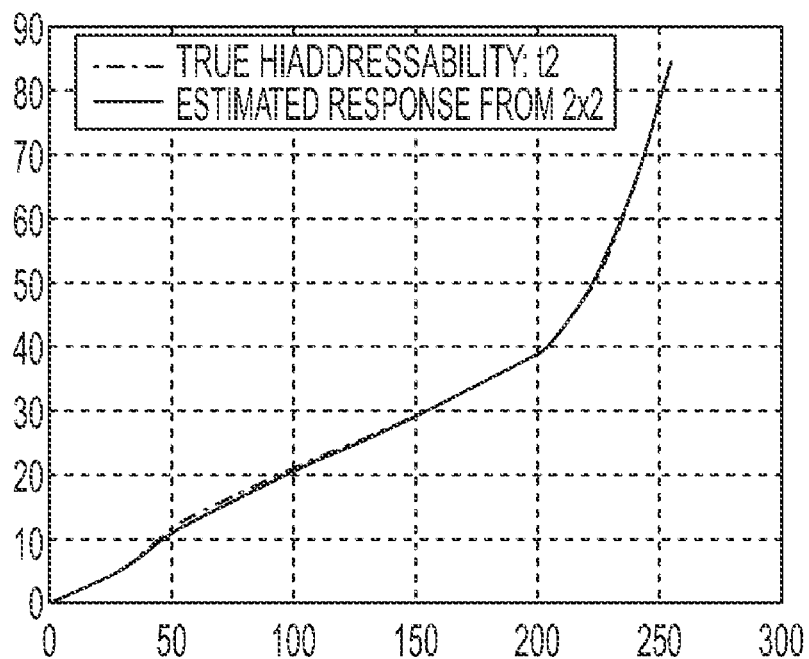

Referring next to FIG. 15, depicted therein is the estimated (solid line) 2×2 response from using Equation 7 versus the true measured hi-addressability (dashed line) response. As is evident from FIG. 15, there is a near perfect overlap between the true (dashed) and estimated (solid) responses.

Figure 16:
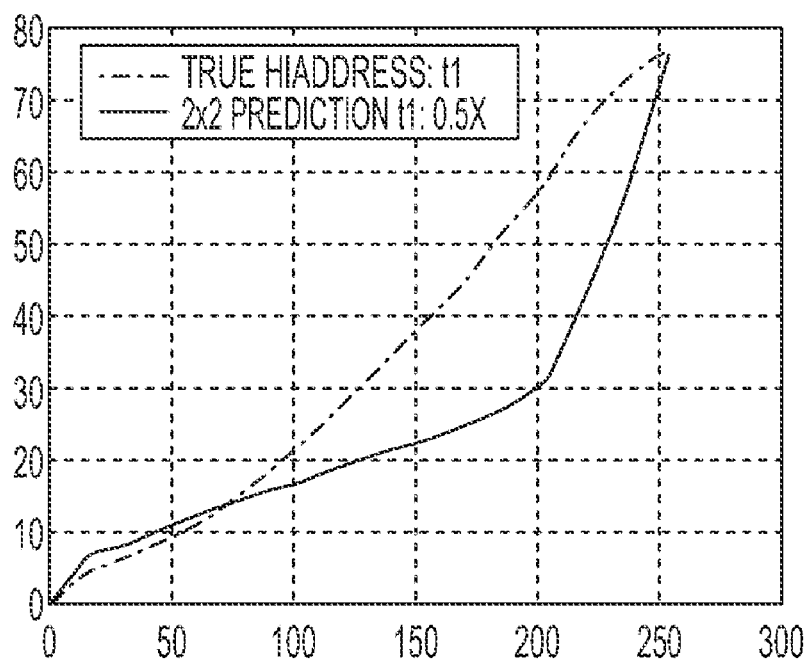
Figure 17:
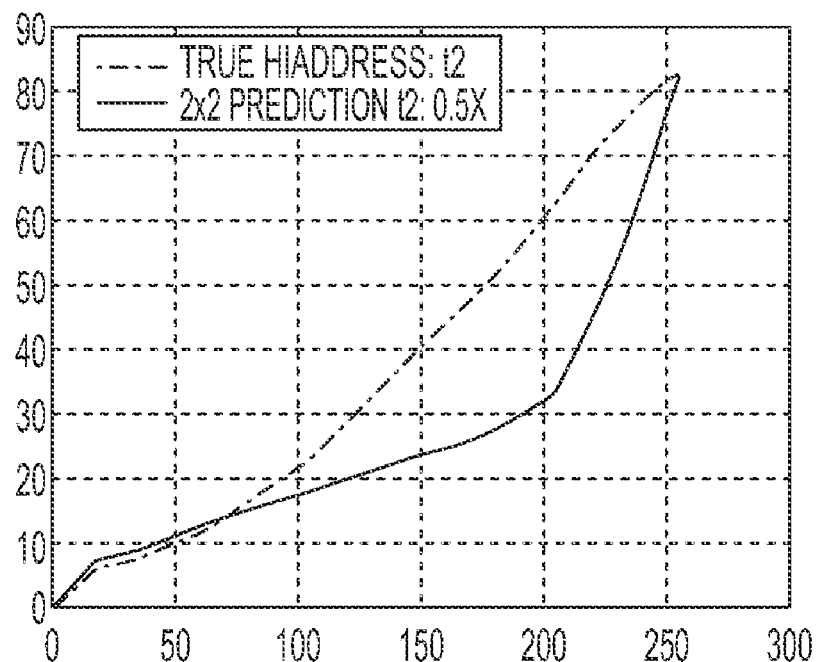
Figure 18:
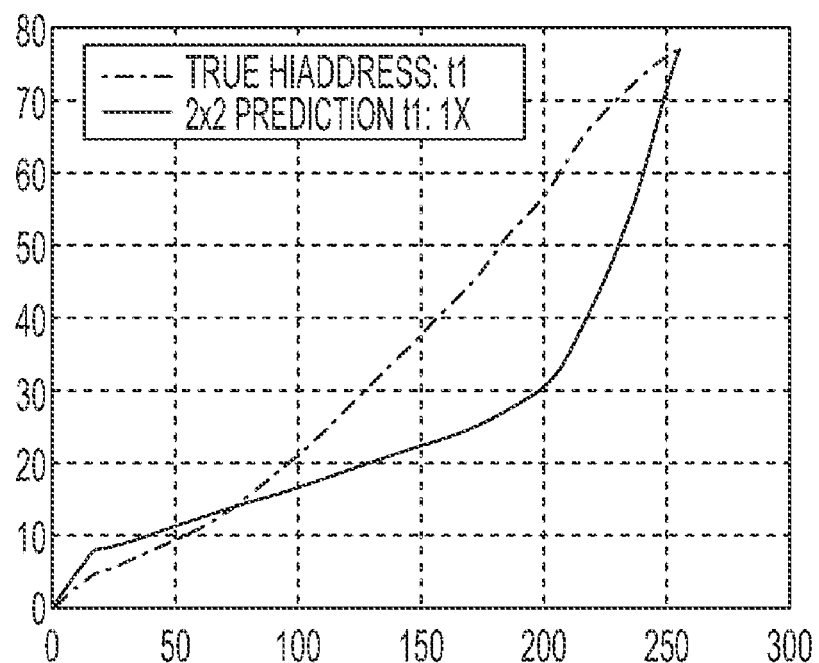
Figure 19:
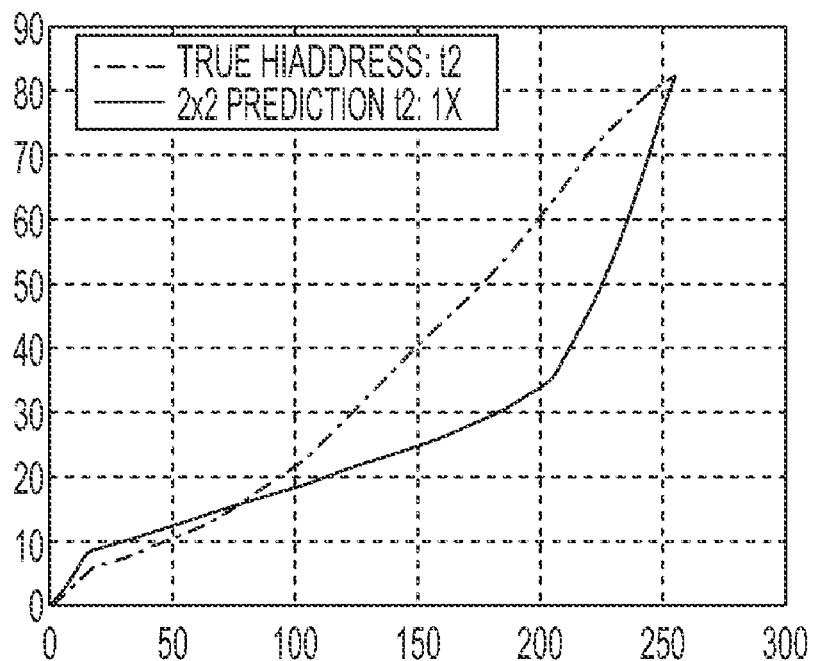
Figure 20:
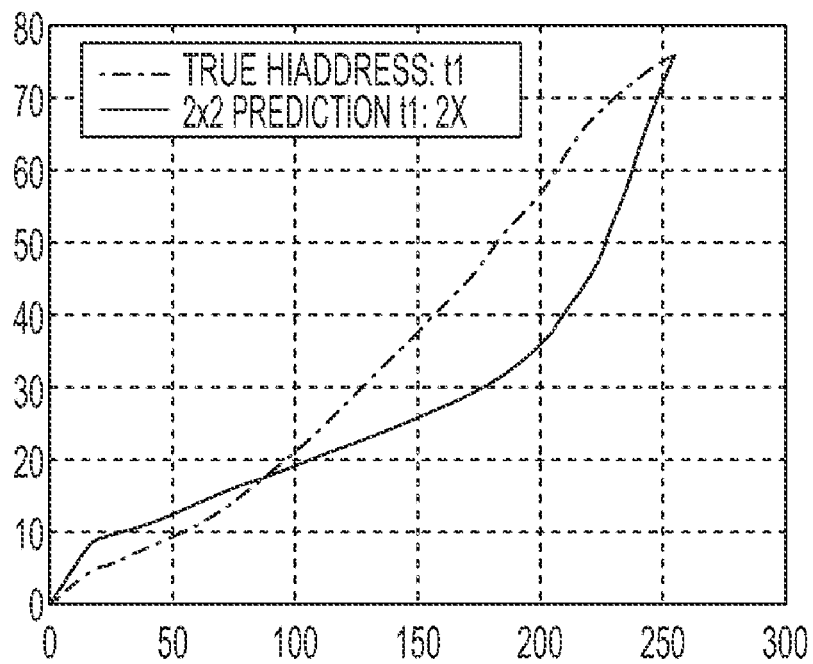
Figure 21:
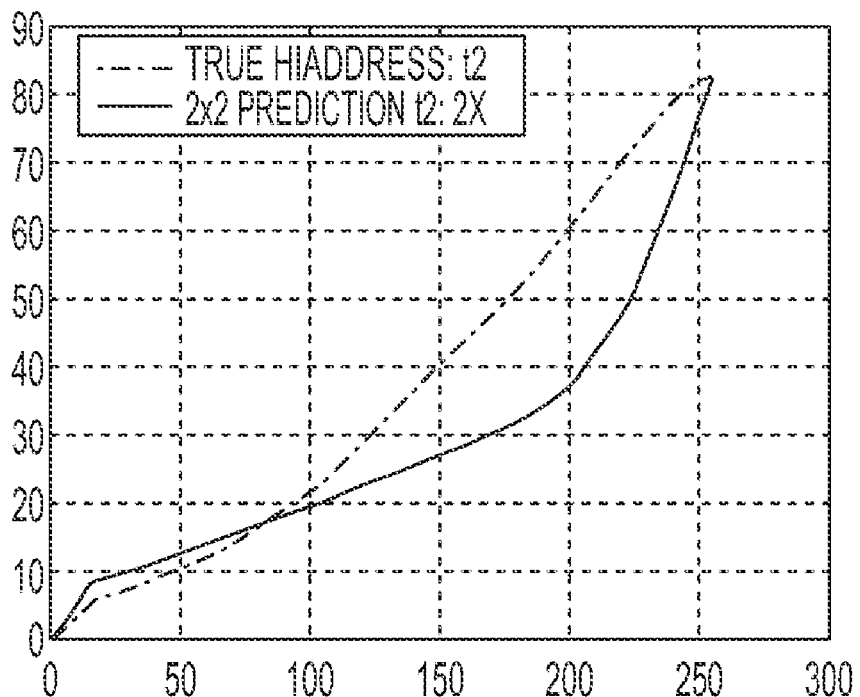
Figure 22:
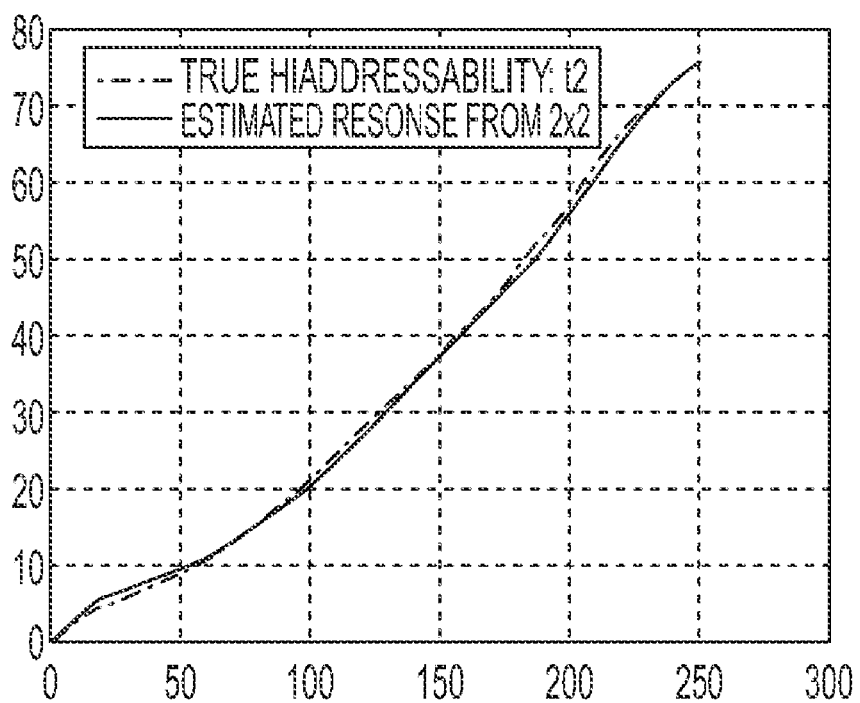

Similar plots and the corresponding correction for the Cyan channel of another xerographic hi-addressability printer are shown in FIGS. 16 through 22. A 200 lpi clustered dot screen was used for the halftone. More specifically, FIG. 16 illustrates the True Hi-Addressability printer response versus the 0.5×2×2 prediction: default state t1, and FIG. 17 the same at drifted state t2. FIG. 18 shows the True Hi-Addressability printer response versus the 1×2×2 prediction at default state t1, and FIG. 19 the same at drifted state t2. FIGS. 20 and 21 respectively show the default (t1) and drifted (t2) states for True Hi-Addressability printer response versus the 2×2×2 prediction, and FIG. 22 shows the True Hi-Addressability printer response versus the estimated response for drifted state t2.

The salient features of the proposed correction in Equation 7 (Note: Eq. 7 is a generalization of Eq. 6, where only one resolution is used and the corresponding weight is equal to one) may be summarized as:

A) The strongest weight was attached to the lowest resolution. In particular, the lowest resolution is the most robust (i.e. insensitive to measurement noise, etc.) but provides a coarse approximation; while the higher resolutions better capture the detail. This can be observed easily in FIGS. 16 through 22.

B) the experiments used weights w1=0.45; w2=0.3; w3=0.25 for a first test printer; and w1=0.48, w2=0.29, w3=0.23 for a second test printer. These weights are in general optimized based on data from multiple printer states—however, this optimization needs to be carried out only once (offline) and once the weights are determined they may be used, as is, in real-time calibration paths. It is contemplated that such weights may be stored, for example, in a memory associated with color balance controller as represented by a printer (FIG. 2; 90).

In light of the disclosure above, a color correction method for a four-color printer is enumerated as follows. The method may be executed, for example, on the systems depicted in the embodiments of FIGS. 2A,B in accordance with pre-programmed instructions, or via other computing platforms associated with a printing system.

I. At a time t1 (default or reference printer state), and
For each colorant channel:
A. Print and measure a plurality (e.g., seven) 2×2 patches shown in FIG. 7 at the required number of resolutions (at least two);
B. For each halftone screen or method:
1. To get a 2×2 TRC estimation, for each constant input digital level:
a. Derive the output binary pattern;
b. Use the 2×2 printer model to interpret the binary pattern as a seven-level gray image;
c. Use Eq. 1, and the measurement of seven 2×2 patches, to get the average output;
2. Store the 2×2 TRC predictions at t1 and for each resolution into the memory;
3. Obtain the true TRC by printing and measuring the outputs of different levels and store the true TRC into the memory.

II. Later, at a time t2 (drifted printer state), and
For each colorant channel:
A. Print and measure the seven 2×2 patches shown by FIG. 7 at the required number of resolutions;

B. For each halftone screen or method:
1. To get a 2×2 TRC estimation, for each constant input level:
   a. Derive the output binary pattern;
   b. Use the 2×2 printer model to interpret the binary pattern as a seven-level gray image;
   c. Use Eq. 1, and the measured result from the step 2a to get the average output;
2. Calculate the correction factor (e.g., sum of weighting factors of at least two resolutions) as in the large square brackets in Eq. 7 (for each digital level) by using the 2×2 TRC estimation at t2 and the 2×2 estimation stored at the initial time t1;
3. Apply the correction obtained above to the true TRC stored at t1 (I.3.) to predict the true TRC at the new time t2
4. Make a corresponding adjustment to the input image based on the predicted true TRC for correcting the color drift.

The foregoing steps may also be characterized in a more general form, wherein the targets of the at least two resolution patches are printed with the halftone independent pattern and then measured to identify the printer response to the target. Separate measurement is accomplished by conventional means for spectral photometric devices. A halftone independent characterization of the device can then be modeled offline with a mathematical transformation comprising the measured response. "Offline" is intended to mean that the characterizing process is performed other than when the printer is performing a user/customer specified task in an ordinary work environment, whereas "online" is such a customer environment. A halftone screen dependent characterization is then modeled with the mathematical transformation to generate the predicted result. The predicted result is compared with a true color measured response to obtain a correction factor for the employed halftone screen print. A second halftone dependent characterization of the printer can then be modeled using the mathematical transformation and the correction factor.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A model-based, halftone independent method for characterizing a high-addressability printer equipped with a plurality of halftone screens, comprising:
   printing a target set of basic patches, said target set including patches having at least two resolutions and comprised of a fundamental binary pattern independent of a halftone screen;
   measuring printer response from the target set;
   modeling a halftone independent characterization of the printer with a mathematical transformation using the measured response;
   modeling a first halftone dependent characterization of the printer with the mathematical transformation to generate a first predicted result using a halftone screen;
   comparing a measured response of the printer using this halftone screen with the predicted result to define a correction factor corresponding to the halftone screen; and
   modeling a second halftone dependent characterization of the printer using a predicted response of the fundamental binary pattern and the correction factor wherein the correction factor can be expressed as a sum of weighting factors of at least two resolutions.

2. The method of claim 1 wherein the printing the target set includes patches printed using 2×2 spatial dot arrangements.

3. The method of claim 1 wherein the modeling of the halftone independent characterization is temporally invariant.

4. The method of claim 3 wherein the printer model is a halftone independent characterization binary printer model parameterized by a table of values generated by printing and measuring canonical binary patterns which are halftone independent.

5. The method of claim 1, wherein said test target set includes at least about seven test patch patterns for each resolution.

6. The method of claim 1, wherein the high-addressability printer operates at an 8× addressability.

7. A model-based, halftone independent method for characterizing a high-addressability printer equipped with a plurality of halftone screens, comprising:
   printing a target set of basic patches, said target set including patches having at least two resolutions and comprised of a fundamental binary pattern independent of a halftone screen;
   measuring printer response from the target set;
   modeling a halftone independent characterization of the printer with a mathematical transformation using the measured response;
   modeling a first halftone dependent characterization of the printer with the mathematical transformation to generate a first predicted result using a halftone screen:
   comparing a measured response of the printer using this halftone screen with the predicted result to define a correction factor corresponding to the halftone screen; and
   modeling a second halftone dependent characterization of the printer using a predicted response of the fundamental binary pattern and the correction, wherein said model comprises at least a first weighting factor and a second weighting factor, wherein the first weighting factor is greater than the second weighting factor and is applied to measure color for the lower of the at least two resolutions.

8. A hiqh-addressability printing system equipped with a plurality of halftone screens, comprising:
   memory storing at least one set of basic patches, said set including patches having at least two resolutions;
   a marking system for printing a target set of basic patches, said target set including patches having at least two resolutions and comprised of a fundamental binary pattern independent of a halftone screen;
   a colorimetric device, said device measuring printer response from the target set: and
   a color balance controller, said controller using the measured response and modeling a halftone independent characterization of the printer with a mathematical transformation to generate a first predicted result using a halftone screen, said color balance controller, further comparing a measured response of the printer using this halftone screen with the predicted result to define a correction factor corresponding to the halftone screen, and modeling a second halftone dependent characterization of the printer using a predicted response of the fundamental binary pattern and the correction factor wherein the correction factor is stored in memory for use by the controller, and can be expressed as a sum of weighting factors of at least two resolutions.

9. The high-addressability printing system of claim 8 wherein said memory stores a target set including patches printed using 2×2 spatial dot arrangements.

10. The high-addressability printing system of claim 8 wherein a temporally invariant model is employed by the color balance controller.

11. The high-addressability printing system of claim 10 wherein the printer model is a halftone independent characterization binary printer model parameterized by a table of values generated by printing and measuring binary patterns which are halftone independent.

12. The high-addressability printing system of claim 8, wherein a first weighting factor is greater than a second weighting factor and the first weighting factor is applied to measure color for the lower of the at least two resolutions.

13. The high-addressability printing system of claim 8, wherein said test target set stored in said memory includes at least about seven test patch patterns for each of said resolutions.

14. The high-addressability printing system of claim 8, wherein said marking system operates at an 8× addressability in at least one orientation.

* * * * *